US011092000B2

(12) United States Patent
Jarvis et al.

(10) Patent No.: US 11,092,000 B2
(45) Date of Patent: Aug. 17, 2021

(54) APPARATUSES AND METHODS FOR SENSING TEMPERATURE ALONG A WELLBORE USING TEMPERATURE SENSOR MODULES COMPRISING A CRYSTAL OSCILLATOR

(71) Applicant: METROL TECHNOLOGY LIMITED, Aberdeen (GB)

(72) Inventors: Leslie David Jarvis, Stonehaven (GB); Shaun Compton Ross, Aberdeen (GB)

(73) Assignee: METROL TECHNOLOGY LIMITED, Aberdeen (GB)

( * ) Notice: Subject to any disclaimer, the term of this patent is extended or adjusted under 35 U.S.C. 154(b) by 378 days.

(21) Appl. No.: 16/303,233

(22) PCT Filed: May 26, 2017

(86) PCT No.: PCT/GB2017/051525
§ 371 (c)(1),
(2) Date: Nov. 20, 2018

(87) PCT Pub. No.: WO2017/203295
PCT Pub. Date: Nov. 30, 2017

(65) Prior Publication Data
US 2020/0318473 A1    Oct. 8, 2020

(30) Foreign Application Priority Data

May 26, 2016 (GB) ..................... 1609294

(51) Int. Cl.
*G01K 13/00*  (2021.01)
*G01K 1/00*   (2006.01)
(Continued)

(52) U.S. Cl.
CPC ............. *E21B 47/07* (2020.05); *G01K 7/32* (2013.01)

(58) Field of Classification Search
USPC .......... 374/136, 148, 117, 208, 166
See application file for complete search history.

(56) References Cited

U.S. PATENT DOCUMENTS 2,619,180 A    11/1952  Smith et al.
3,020,961 A     2/1962  Orr
(Continued)

FOREIGN PATENT DOCUMENTS

CN    203531888    4/2014
CN    104062691    9/2014
(Continued)

OTHER PUBLICATIONS

EPO Examination Report for EP Application No. 17727357.0, dated Nov. 22, 2019.
(Continued)

*Primary Examiner* — Mirellys Jagan
(74) *Attorney, Agent, or Firm* — Womble Bond Dickinson (US) LLP

(57) ABSTRACT

Apparatus (100) for use in sensing temperature along a wellbore, comprising: tubing (110) comprising at least 6 temperature sensor modules (120) provided at locations along the inside of the tubing, each temperature sensor module comprising a temperature sensor comprising a crystal oscillator having an electrical oscillation frequency that varies with temperature; the tubing having an external diameter of less than 14 mm at the location of at least 6 temperature sensor modules.

35 Claims, 5 Drawing Sheets

(51) Int. Cl.
*G01K 7/00* (2006.01)
*G01K 11/22* (2006.01)
*E21B 47/07* (2012.01)
*G01K 7/32* (2006.01)

(56) References Cited

U.S. PATENT DOCUMENTS

| | | | |
|---|---|---|---|
| 5,221,916 | A | 6/1993 | McQueen |
| 5,394,141 | A | 2/1995 | Soulier |
| 5,576,703 | A | 11/1996 | MacLeod et al. |
| 6,173,772 | B1 | 1/2001 | Vaynshteyn |
| 6,324,904 | B1 | 12/2001 | Ishikawa et al. |
| 6,357,525 | B1 | 3/2002 | Langseth et al. |
| 6,494,616 | B1 | 12/2002 | Tokhtuev et al. |
| 8,215,164 | B1 | 7/2012 | Hussain et al. |
| 9,840,908 | B2 | 12/2017 | Patel et al. |
| 2002/0020535 | A1 | 2/2002 | Johnson et al. |
| 2002/0066563 | A1 | 6/2002 | Langseth et al. |
| 2003/0056952 | A1 | 3/2003 | Stegemeier et al. |
| 2004/0104029 | A1 | 6/2004 | Martin |
| 2005/0077086 | A1 | 4/2005 | Vise |
| 2006/0225881 | A1 | 10/2006 | O'Shaughnessy et al. |
| 2007/0162235 | A1 | 7/2007 | Zhan et al. |
| 2007/0236215 | A1 | 10/2007 | Innes et al. |
| 2008/0066536 | A1 | 3/2008 | Goodwin et al. |
| 2008/0156482 | A1 | 7/2008 | Gubar et al. |
| 2009/0229813 | A1 | 9/2009 | Brink et al. |
| 2011/0158050 | A1* | 6/2011 | Merino .................... H01Q 1/04 367/81 |
| 2011/0174487 | A1 | 7/2011 | Burleson et al. |
| 2011/0303409 | A1 | 12/2011 | Harrigan et al. |
| 2012/0085540 | A1 | 4/2012 | Heijnen |
| 2013/0075109 | A1 | 3/2013 | Frisby et al. |
| 2013/0133883 | A1 | 5/2013 | Hill |
| 2013/0257435 | A1* | 10/2013 | Smithson ................ E21B 47/06 324/338 |
| 2013/0299165 | A1 | 11/2013 | Crow |
| 2014/0041873 | A1 | 2/2014 | Lovik |
| 2014/0311736 | A1 | 10/2014 | Pipchuk et al. |
| 2015/0159480 | A1 | 6/2015 | Kalyanaraman et al. |
| 2015/0233773 | A1 | 8/2015 | Sale et al. |
| 2015/0252667 | A1 | 9/2015 | Chronister |
| 2015/0292288 | A1 | 10/2015 | Kasperski et al. |
| 2015/0315895 | A1 | 11/2015 | Patel et al. |
| 2016/0123133 | A1 | 5/2016 | Leeflang et al. |
| 2016/0202385 | A1* | 7/2016 | Pelletier ................ E21B 47/113 250/256 |
| 2019/0203582 | A1* | 7/2019 | Jarvis ...................... G01K 1/026 |
| 2019/0212209 | A1* | 7/2019 | Jarvis ....................... G01K 7/20 |
| 2020/0318473 | A1* | 10/2020 | Jarvis ...................... E21B 47/07 |

FOREIGN PATENT DOCUMENTS

| | | |
|---|---|---|
| CN | 107476822 | 12/2017 |
| DE | 102010014415 | 12/2010 |
| EP | 2192262 | 6/2010 |
| EP | 2886790 | 6/2015 |
| GB | 2423101 | 8/2006 |
| GB | 2522272 | 7/2015 |
| WO | 200301169 | 1/2003 |
| WO | 2003098176 | 11/2003 |
| WO | 20060082364 | 8/2006 |
| WO | 20070056121 | 5/2007 |
| WO | 2014022384 | 2/2014 |
| WO | 2014120988 | 8/2014 |
| WO | 20150099762 | 7/2015 |
| WO | 2017203285 | 11/2017 |
| WO | 2017203286 | 11/2017 |
| WO | 2017203287 | 11/2017 |
| WO | 2017203288 | 11/2017 |
| WO | 2017203290 | 11/2017 |
| WO | 2017203291 | 11/2017 |
| WO | 2017203292 | 11/2017 |
| WO | 2017203293 | 11/2017 |
| WO | 2017203294 | 11/2017 |
| WO | 2017203296 | 11/2017 |

OTHER PUBLICATIONS

Examination Report for GCC Application No. 2017/33462, dated Jan. 21, 2019.
Examination Report for GCC Application No. 2017/33462, dated Jun. 28, 2019.
Examination Report for GCC Application No. 2017/33462, dated Nov. 3, 2019.
EAPO Office Action for Eurasian Application No. 201892752, dated Mar. 12, 2020.
UKIPO Combined Search and Examination Report for GB1609293.4, dated Nov. 10, 2016.
UKIPO Combined Search and Examination Report for GB1609294.2, dated Nov. 15, 2016.
UKIPO Combined Search and Examination Report for GB1609295.9, dated Jul. 7, 2016.
UKIPO Examination Report for GB1609295.9, dated Dec. 3, 2018.
UKIPO Combined Search and Examination Report for GB1609291.8 dated Nov. 4, 2016.
Schlumberger, WellWatcher, Permanent Downhole Reservoir and Production Monitoring, 2008.
Schlumberger, WellWatcher Flux, Digital temperature array and PT gauge system, 2014.
International Search Report for PCT/GB2017/051525, dated Jun. 27, 2017.
Schlumberger: "WellWatcher Flux, Multizonal reservoir monitoring system", 2016.
Copending International Application No. PCT/GB2017/051515 filed May 26, 2017.
Copending International Application No. PCT/GB2017/051516 filed May 26, 2017.
Copending International Application No. PCT/GB2017/051517 filed May 26, 2017.
Copending International Application No. PCT/GB2017/051518 filed May 26, 2017.
Copending International Application No. PCT/GB2017/051520 filed May 26, 2017.
Copending International Application No. PCT/GB2017/051521 filed May 26, 2017.
Copending International Application No. PCT/GB2017/051522 filed May 26, 2017.
Copending International Application No. PCT/GB2017/051523 filed May 26, 2017.
Copending International Application No. PCT/GB2017/051524 filed May 26, 2017.
Copending International Application No. PCT/GB2017/051526 filed May 26, 2017.
Examination Report for Corresponding Indonesian Application P00201809757, dated Dec. 1, 2020.
Examination Report for Indian application 201837047224, dated Feb. 10, 2021.

* cited by examiner

APPARATUSES AND METHODS FOR SENSING TEMPERATURE ALONG A WELLBORE USING TEMPERATURE SENSOR MODULES COMPRISING A CRYSTAL OSCILLATOR

CROSS REFERENCE TO RELATED APPLICATIONS

This application is a 35 U.S.C. 371 National Stage of International Application No. PCT/GB2017/051525, titled "APPARATUSES AND METHODS FOR SENSING TEMPERATURE ALONG A WELLBORE USING TEMPERATURE SENSOR MODULES COMPRISING A CRYSTAL OSCILLATOR", filed May 26, 2017, which claims priority to GB Application No. 1609294.2, titled "APPARATUSES AND METHODS FOR SENSING TEMPERATURE ALONG A WELLB ORE USING TEMPERATURE SENSOR MODULES COMPRISING A CRYSTAL OSCILLATOR", filed May 26, 2016, all of which are incorporated by reference herein in their entirety.

FIELD OF THE TECHNOLOGY

The invention relates generally to sensing temperature along a wellbore. More particularly, the invention relates to methods and apparatuses for sensing temperature along a wellbore using temperature sensor modules comprising a crystal oscillator, and to a well incorporating said apparatuses, and to methods of calibrating said apparatuses.

BACKGROUND

Wells are drilled for a variety of purposes commonly relating to hydrocarbon exploration or extraction. Various well logging tools and methods may be used to gain data from wells during the drilling, testing, completion, production, suspension and abandonment stages of a well. This data can be used for a number of reasons, such as to optimise production from the reservoir or to design further wells in the same reservoir. The development of a model for the well and the flow rate from the formations opening into the well can greatly facilitate the targeted exploitation of the reservoir.

It is particularly important to exploration and extraction to collect data relating to the volumetric flow rate and pressure from various formations inside the well. Current tools and methods for logging volumetric flow rate and pressure can be costly and complicated, whereas it would be preferable to collect accurate, high-resolution data with as few technical and procedural constraints and requirements as possible.

Collecting temperature monitoring data along a wellbore can be useful in determining the type and flow rate of fluids entering a well. For example, oil entering a well at a given location generally has a warming effect, whereas water entering a well has an even greater warming effect. On the other hand, gas typically has a cooling effect, as do the heavy fluids that are typically used to balance and kill wells at the end of their lives. Generally, these warming and cooling effects are exaggerated where the flow rate of those fluids is greater.

Currently, the most commonly used tool for accurately sensing a temperature along a wellbore is a fibre-optic based distributed temperature sensor (DTS) system. These systems typically rely on information contained in the backscattered light from locations along the length of a fibre running along a wellbore, such as the frequency, time of flight, and intensity thereof, to infer a local temperature variation of the fibre due to the local environment that has caused the backscattering. DTS systems can provide a continuous temperature profile along the length of the fibre down to a spatial resolution of around 1 metre with a high level sensitivity and accuracy. However, the interrogator unit that generates and couples light into the fibre optics and that senses and analyses the backscattered light to generate the temperature data typically has to be provided at the surface of the well, generally coupled through the Christmas tree. Thus, the length of the fibre-optic that has to be run into the well can be considerable. For example, where a well test is being run on a short, 100 m section of well at a depth of 4000 m (as a measured depth from a rotary table of a drill rig, MDRT), a length of fibre-optic of greater than 4 km is necessary to test only 100 m of the well. Further, as packers or other annular seals against the wellbore surface are usually used to isolate sections of the well under test, for example during Drill Stem Testing (DST), the fibre-optic cabling is required to penetrate through or extend across the packer which can significantly complicate the design of the DTS system, the packer, and significantly add to the cost of the test.

An alternative to the prior art DTS systems that has been introduced to the market by Schlumberger is the WellWatcher Flux™ digital temperature array (http://www.slb.com/~/media/Files/completions/product sheets/wellwatcher/wellwatcher flux ps.pdf). In this system, instead of using fibre optics, arrays of miniaturised, hermetically sealed, resistive temperature sensors are provided at intervals along the length of a ¼ inch (6.35 mm) diameter tubing. The tubing is again connected through the Christmas tree at the well head and control electronics provided at each temperature sensor array provide a digital readout of the sensed temperature data at the arrays via an RS-485 connection. While the arrays of temperature sensors are provided in a ¼ inch (6.35 mm) diameter tubing, the temperature sensors produce larger diameter sections of the tubing, having an outer diameter of at least 17 mm for at least 400 mm in length.

In such digital temperature arrays having this type of construction and operation, the larger sections containing the temperature sensors and control electronics are welded to the tubing, which means that the process for manufacturing the digital temperature array of this can be complicated requiring a number of different components and steps to be constructed separately and joined together. The provision of a significant amount of complicated control electronics is required in each enlarged section of the tubing to try to achieve autonomous sensors that have a desired accuracy, which can lead to the sensor modules being bulky and does not lend itself to miniaturisation or ruggedisation of the sensor modules for reliable operation in hazardous environments downhole, particularly in open hole configurations. The use of individual digital sensor modules is prone to drift, not only of the sensor, but also of the individual measurement and reference electronics, and can lead to undesirable drift of the temperature data from sensor modules relative to one another. Further, as the tubing has extended sections with a larger outer diameter, these render the digital temperature array complicated and difficult to manufacture, install and use and relatively fragile in the well. Due to the extended sections, with larger outer diameters, the array is also difficult to install in small spaces and difficult to seal against. For example, installing the digital temperature arrays of this type across packers can be particularly difficult.

It is in this context that the present invention has been devised.

SUMMARY OF THE INVENTION

Viewed from one aspect, the present invention provides apparatus for use in sensing temperature along a wellbore, comprising: tubing comprising at least 6 temperature sensor modules provided at locations along the inside of the tubing, each temperature sensor module comprising a temperature sensor comprising a crystal oscillator having an electrical oscillation frequency that varies with temperature; the tubing having an external diameter of at most 14 mm at the location of at least 6, or all, of temperature sensor modules.

In accordance with this aspect, the use of the oscillation frequency of crystal oscillators to provide temperature sensitivity enables an extremely sensitive and stable temperature sensor array to be provided inside a length of small diameter tubing, facilitating manufacture of the array and its installation in a well. Crystal oscillators are extremely accurate as they are not susceptible to noise or resistance effects of wiring and provide extremely accurate temperature measurements that are stable for a very long period of time, and give high inter-sensor accuracy particularly where a common reference is used, so they are particularly appropriate where the apparatus is to be provided in situ in the wellbore to monitor temperature extremely accurately over long periods. In addition, crystal temperature sensors are compact in size and can be provided inside small-diameter tubing without having to weld larger outer diameter sections into provide the temperature sensor modules. This is particularly achievable as the temperature sensor modules incorporating the crystal temperature sensors can be provided with little additional electronics and so can be made small enough to embed inside the small diameter tubing having a diameter of less than 14 mm. In addition, a large number of sensors can be provided inside the small diameter tubing, for example, by providing the temperature sensor modules to be connected in sequence in a simple network to be digitally addressable to respond with a simple signal indicative of the temperature.

In embodiments, the crystal oscillators are quartz oscillators, and/or piezoceramic oscillators. In embodiments, the temperature sensor module further comprises a digital counter. In embodiments, the temperature sensor module further comprises a microprocessor. In embodiments, the temperature sensor module further comprises a gate array. Here, the temperature sensor module can be made to comprise as little as an oscillator as the sensor and electronic components sufficient to determine and provide a signal indicative of the resonant frequency of the oscillator, variation in which is indicative of the temperature. Thus the temperature sensors can be made to have a simple construction, facilitating their manufacture and allowing them to be sufficiently small in size to be able to fit inside the small diameter tubing.

In embodiments, the apparatus further comprises a control module electrically connected to each crystal oscillator and having a reference crystal oscillator common to at least 6, or all, of the temperature sensors. In embodiments, the control module is configured to determine a temperature at least one, or each, crystal oscillator by comparing the frequency of the electrical signal generated by the temperature sensor crystal oscillator with the frequency of the electrical signal generated by the reference crystal oscillator. In embodiments, the control module is configured to determine a temperature at least one, or each, crystal oscillator by comparing a signal derived from the electrical signal generated by each crystal oscillator temperature sensor with an electrical signal derived from the reference crystal oscillator. In this way, the provision of a common reference crystal oscillator provides extremely high inter-sensor stability, with low drift, allowing in particular the relative variation in temperature between temperature sensor modules to be determined over time with accuracy. In the downhole environment, particularly at elevated temperatures, drift of the reference and measurement circuit can frequently have a greater impact on temperature reading accuracy over time than drift of the sensor itself, provision of a common reference and measurement circuit eliminates the effect of this drift on inter-sensor accuracy. Further, by providing in a control module the additional electronic components, such as the reference crystal oscillator and other components configured to receive and process the signals from the temperature sensors, these are kept away from the temperature sensor modules themselves, allowing the temperature sensor modules to be made small, indeed small enough to fit inside a small diameter tubing.

In embodiments, wherein the apparatus is configured to use the temperature sensitivity of the temperature sensitive crystal oscillator of at least one, or each temperature sensor to infer a thermal characteristic (which may be a temperature characteristic) of the environment to which the tubing is exposed at the location of that temperature sensor.

In embodiments, the apparatus further comprises an electrical network comprising at least 2, or each, temperature sensor module coupled to a common wire, or wires, optionally 3 wires, more optionally 2 wires. In embodiments, the electrical network comprises a single wire, with a further electrical connection provided via the tubing. In this way, the temperature sensor modules can be installed and wired inside the small diameter tubing using simple electrical networks.

In embodiments, the tubing is filled with and encapsulates a non-conducting liquid, optionally an oil, and optionally wherein the tubing comprises a pressure balancing means, optionally including a bellows or flexible bladder, configured to act to equalise internal pressure in the tubing with the ambient environment. This improves the robustness of the sensor array to variations in pressure in use downhole.

In embodiments, the tubing external diameter is in the range of 3 mm to 14 mm, optionally in the range of 6 mm to 10 mm, at the location in the tubing of at least one of the temperature sensor modules, preferably at least 50%, more preferably at least 90%, and particularly 100% of the temperature sensor modules. Thus it should be clear in these embodiments that the invention is directed to the provision of apparatus for measuring temperature downhole in a small diameter tubing. In embodiments, the external diameter of the tubing is less than 14 mm at the location of at least 10, preferably at least 20, more preferably at least 40 temperature sensor modules. In embodiments, the external diameter of the tubing is less than 10 mm at the location of at least 10, preferably at least 20, more preferably at least 40 temperature sensor modules. In embodiments, the tubing comprises at least 10, preferably at least 20, more preferably at least 40 temperature sensor modules along its length. This can provide sensitivity and a very high spatial resolution, or enable sensing over a very long distance. In embodiments, the outer diameter of the tubing is the same at locations in the tubing of at least one or all of the temperature sensor modules and at locations in the tubing away from the at least one or all of the temperature sensor modules. In embodiments, the outer diameter of the tubing is not increased at the location in the tubing of at least one of the temperature sensor modules, preferably at least 50%, more preferably at least 90%, and particularly 100% of the temperature sensor modules. In embodiments, the external profile of the tubing is not changed at the location in the tubing of at least one of the temperature sensor modules, preferably at least 50%, more preferably at least 90%, and particularly 100% of the temperature sensor modules. By "at the location" we mean locations of the tubing over the length or of part of the length of the temperature sensor module. In embodiments, the outer diameter of the tubing remains substantially constant along the tubing. By this we mean that, the outer diameter of the tubing neither increases nor decreases along the length of the tubing due to the presence or absence of temperature sensor modules. This does not exclude the outer diameter increasing due to some other component provided in the tubing. In embodiments, the temperature sensor modules are configured to provide a smooth profile of the outer diameter of the tubing along the tubing. By providing a smooth profile, the tubing and apparatus can be more easily installed in the well. In accordance with these embodiments, lumps and changes in the shape and outer dimensions in the tubing due to the provision of the temperature sensor modules can be avoided. This facilitates installation of the temperature sensing apparatus in a well, and allows the apparatus to be easily deployed in more restricted spaces and sealed against, which facilitates installation across packers. The smooth outer diameter tubing array is achievable by using crystal oscillators as the temperature sensor, which can be small in size, and with few electronic components in the temperatures sensor modules but instead providing a majority of the control electronics in a control module at a location away from the temperature sensor modules in the tubing. This allows the temperature sensor array to be manufactured more easily, efficiently and cost effectively, and results in a shorter manufacturing lead time for the customer.

In embodiments, multiple control modules are provided, wherein individual control modules control sets of temperature sensors, and the control modules are linked to one or more master control modules.

In embodiments, the apparatus further comprises communication means within the tubing to enable data communication along the tubing, for instance additional wire(s) may be provided to enable communication between control modules, or to enable communication with other devices within the well.

In embodiments, the apparatus further comprises a power source configured to provide operational power to the apparatus for sensing temperature in the wellbore in use, wherein the power source is arranged to be provided as an in-well power source in use. In embodiments, the power source comprises one or more primary cells, secondary cells and/or downhole power generators. In embodiments, the power source may be replaceable in the well, for example the battery or power generator may be replaced using wireline, or coiled tubing.

In embodiments, the apparatus is configured to be powered in use from a position higher in the well, optionally from surface, and optionally via inductive or capacitive coupling.

In embodiments, the apparatus further comprises a wireless data communication module coupled to the apparatus for use in sensing temperature in a wellbore and arranged to, in use, wirelessly transmit along the well signals indicative of a temperature sensed in the wellbore by the apparatus, optionally using relays or repeaters. The wireless communication module may be coupled to the apparatus wirelessly, by a separate wireless connection, or electrically by a wired connection and optionally also physically. In embodiments, the wireless data communication module is configured to transmit said signals acoustically and/or electromagnetically. In accordance with these embodiments, the apparatus for sensing a temperature can be provided as an autonomous system downhole, in which cabling for providing power and/or communication capabilities does not need to be provided. By providing a local power source and wireless communication capabilities, the apparatus for temperature sensing can be easily installed downhole in deep wells without having to run kilometres of cabling to the surface, through sealing elements, etc. By enabling data capture and recovery without having to recover the hardware, there is the option to discard the apparatus downhole after use. Alternatively, or in addition, the apparatus may be configured to store and/or transmit sensor data. The storing of the sensor data may only be for a short period such as up to 1 second or 1 minute, 1 hour or 1 day, for example for the purposes of buffering, or alternatively or in addition, the storing of the sensor data may be for longer periods such as at least a day, at least a month at least a year, at least 2 years, or at least 5 years, for the purposes of long term data storage and subsequent recovery, or partial recovery, wirelessly, by a wired connection or by physical retrieval.

In embodiments, the apparatus wireless data communication module is further arranged to receive control signals for controlling the operation of the apparatus. Alternatively, the apparatus may comprise further a wireless receiver, or transceiver arranged to receive control signals. The wireless receiver or transceiver may be provided as part of the wireless communication module described above, or as a wireless control signal receiver/transceiver module which may be provided in the apparatus separately from the above-described wireless control module. The operation of the apparatus may be controlled by the received signals. Control may include, control of data acquisition, data transmission, and/or to control heating or cooling of the sensors (as described in more detail below).

Viewed from another aspect, the present invention provides a well comprising a well apparatus having apparatus for use in sensing temperature in a wellbore as described in accordance with the abovementioned aspects and embodiments, the apparatus being arranged to sense a temperature in a wellbore of the well. In embodiments, the well apparatus comprises a tubular element and an annular sealing device provided at least 100 m below a surface of the well, and between the wellbore or a casing of the wellbore and a tubular. The annular sealing device is a device which seals between two tubulars (or a tubular and the wellbore), such as a polished bore and seal assembly or a packer element. The seal assembly may be associated with a polished bore sub in a casing or liner. The packer element may be part of a packer, bridge plug, or liner hanger, especially a packer or bridge plug. The annular sealing device may be arranged, e.g., to seal the flow of fluid between a well casing and a test or production string. In this respect, the temperature sensing apparatus may be used in the production zone of the well below the surface proximal to a formation for sensing temperature variations due to, e.g. the flow of product and other fluids, rather than being used near the well-head to sense temperature there for another purpose.

In embodiments, the apparatus for use in sensing temperature in a wellbore is provided entirely below the annular sealing device. In embodiments, the tubing of the apparatus for use in sensing temperature in a wellbore does not extend across the annular sealing device. In embodiments, the tubing of the apparatus for use in sensing temperature in a wellbore is provided below and extending across the annular sealing device, and wherein a control module of the apparatus for use in sensing temperature is provided in the wellbore below the annular sealing device. In this respect, the apparatus for using in sensing temperature in a wellbore may be provided as a fully autonomous system operating as a self-powered unit, below an annular sealing device, without having to provide power and/or communication cabling across the annular sealing device e.g. from the surface. In alternative embodiments, the tubing of the apparatus for use in sensing temperature in a wellbore is provided below and extending across the annular sealing device, and wherein a control module of the apparatus for use in sensing temperature is provided in the wellbore above the annular sealing device. The apparatus may still be provided downhole as an autonomous system.

In embodiments, a control module of the apparatus for use in sensing temperature in a wellbore is located at the end of the tubing, optionally at the end of the tubing nearest the surface, optionally below the annular sealing device.

In embodiments, the tubing of the apparatus for use in sensing temperature in a wellbore extends along and/or around a tubular element in the well. In embodiments, the tubular element in the well is one of a generally tubular drill string, a test string, a completion string, a production string, an injection string, a work-over string, an observation string, a suspension string, an abandonment string, a casing string, a fracturing string, a gravel pack string, a screen or a liner. Strings may comprise multiple elements such as pipe, valves, collars, subs, etc., some minor elements of which may not be tubular. In embodiments, the tubing is clamped to the tubular element in the well, by which clamping is intended to be understood to include securing by other means, for example, by taping, strapping, bolting, gluing. In embodiments, the apparatus is deployed in the well on wireline, or coiled tubing, and optionally set and/or suspended in the well. The apparatus may be deployed in the well for an extended period of time, optionally at least 6 months, optionally at least 1 year, optionally at least 2 years, optionally up to 5 years, to monitor the temperature of the well. Data from the apparatus can enable the inference of flow rates, and can be used to identify the type of fluid and location of fluid entry, and when used to monitor a barrier can determine the presence or absence of leaks.

In embodiments, the tubing is clamped to and extends across a perforating gun or guns. In this embodiment, the apparatus for use in sensing a temperature in a wellbore can be run in together with guns and, as it is robust enough to withstand the pressure shockwave, the apparatus is then arranged to provide temperature sensing information before, during and after perforation of the well using the guns. The apparatus, or multiple apparatuses, may be deployed along multiple independently activated perforating guns, and thus provide information on changing downhole conditions, as each perforating gun is activated.

In embodiments, the apparatus for use in sensing a temperature in a wellbore can be run in to the well such that the tubing of the apparatus is in a groove on an element of the string, such as a tubular of the well, perforating guns, screen, carrier, sub or packer.

In embodiments, the apparatus can be deployed at a barrier in the well such as a packer, bridge plug, cement, resin, or rigid or flexible plugging material. Data from the apparatus can be used to confirm the integrity of the barrier, there will generally be a temperature change associated with any leak. The apparatus may be deployed around, above, below, and/or within the barrier.

In embodiments, the apparatus for use in sensing a temperature in a wellbore can be deployed in a subsea well. This is particularly advantageous for embodiments with memory and/or wireless capability, as the additional complexity, cost, and risk associated with the use of cabled monitoring systems is especially significant in subsea wells.

Viewed from another aspect, the present invention provides a method of operation of apparatus as described in relation to the abovementioned aspects and embodiments to determine a thermal characteristic of a temperature sensor thereof, comprising: actively heating and/or cooling at least one of the temperature sensors in the tubing; and monitoring a change of temperature of the or each sensor during and/or after heating and/or cooling. In embodiments, the method further comprises, based on the change of temperature, or the rate of change of temperature, or the power to create a change temperature of a sensor during and/or after heating and/or cooling, inferring a fluid characteristic (such as a flow rate or an identification of the type of component fluids in the well) of the environment to which the tubing is exposed at the locations of that temperature sensors. In embodiments, actively heating at least one of the temperature sensors in the tubing comprises self heating the sensors by applying a current therethrough. In embodiments, at least one temperature sensor of the apparatus is heated by applying a current through a resistor or resistance associated with the temperature sensor module. In this way, the temperature sensitivity of the temperature sensor modules and their relative or absolute response to changes in temperature (e.g. by actively heating and/or cooling the sensors, or by sensing ambient changes in temperature) can be used to indicate and provide information usable to infer the operational conditions of the well. For example, when oil enters the well there may be a heating effect, and when water enters the well there may be an even greater heating effect. Conversely, when gas enters the well there is generally a cooling effect. The effect measured is generally on the combined fluid flow. The rate of heating and/or cooling can be used to infer the flow rates and components of fluid in the well. Additionally active heating and/or cooling of the sensors can further assist in identifying fluid types as the heating and/or cooling on the sensors will be affected by the thermal mass of the surrounding fluid, particularly at low flow rates and in static conditions.

The apparatus can be used in at least one of different phases of well life including drilling, testing, completion, production/injection, fracturing, work-over, observation, suspension, and abandonment, to sense temperature along the wellbore and infer fluid characteristics. The apparatus may be deployed on the outside of casing, or liner, or screens, or within a gravel pack, or on tubulars in cased or open-hole. The apparatus may be used to monitor production from, or injection to, cross-flow within, or fluid treatment of a well or reservoir.

Where 'across' is used in this patent in the context of the tubing, where appropriate it may be interpreted as across, along, or around, that is it may run the partial, entire, or extend beyond the length of an associated tubular, and/or be wrapped around said tubular in a ring or helix.

BRIEF DESCRIPTION OF THE DRAWINGS

Aspects of the invention will now be described in more detail in relation to certain exemplary embodiments, with reference to the accompanying drawings, in which.

DESCRIPTION OF THE EMBODIMENTS

Figure 1:
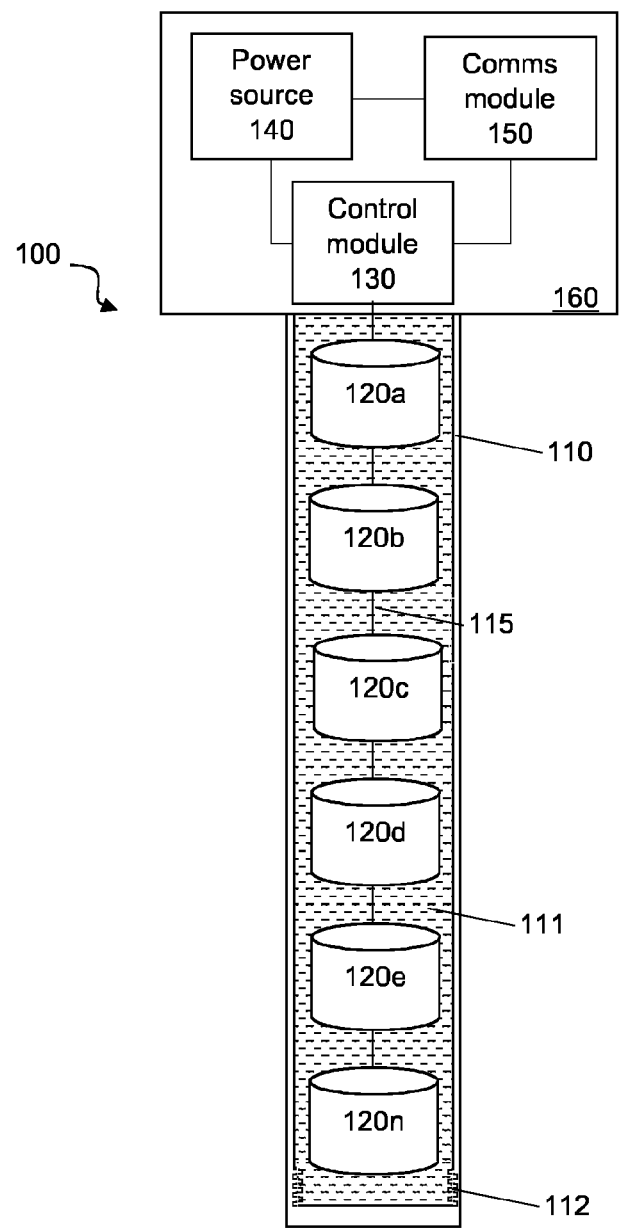
FIG. 1 shows a schematic illustration of an embodiment of an apparatus for use in sensing temperature in a wellbore comprising crystal oscillator temperature sensors in accordance with aspects of the present invention.

Referring now to FIG. 1, embodiments in accordance with aspects of the invention provide apparatus 100 for use in sensing temperature in a wellbore. As will be explained in more detail in relation to FIG. 2, the apparatus 100 is to be placed in a wellbore e.g. during a well test, to sense a temperature therein and to communicate the temperature sensed thereby to the surface.

The apparatus 100 comprises tubing 110 comprising a plurality of temperature sensor modules 120a, 120b, 120c . . . 120n provided at locations along the inside of the tubing 110. As will be explained in more detail below, the temperature sensor modules 120a, 120b, 120c . . . 120n each comprise a temperature sensor having electrical properties that vary with temperature.

In embodiments, the tubing 110 is metallic, preferably, one of a stainless steel, a duplex or super-duplex stainless steel, a nickel alloy, titanium or a titanium alloy. In embodiments, the tubing outer diameter is in the range of 3 mm to 14 mm. A smaller diameter tubing, such as a 6 mm (¼ inch) tubing, may be used for normal deployments. Where a more robust system is needed, a larger diameter tubing, such as a 10 mm (⅜ inch) tubing may be used. The tubing 110 is filled with and encapsulates a non-conducting oil 111 that acts to protect the temperature sensor modules 120a, 120b, 120c . . . 120n, particularly from pressure shockwaves. The tubing 110 comprises a bellows 112 configured to act as pressure balancing means to equalise internal pressure in the tubing with the ambient environment. To provide further protection from pressure variations and from the ambient environment the temperature sensor modules 120a, 120b, 120c . . . 120n are encased in a polyurethane resin or another suitable potting compound such as a thermoset plastic, epoxy resin or a silicone or rubber gel.

As can be seen from the schematic illustration of FIG. 1, the outer profile of the tubing 110 remains substantially constant along the length of the tubing 110 insofar as that all of the temperature sensor modules 120a, 120b, 120c . . . 120n do not cause the tubing 110 to need to have a larger diameter at the location of the sensors in order to accommodate them. Rather, the temperature sensor modules 120a, 120b, 120c . . . 120n are accommodated inside the tubing. In embodiments, the tubing profile may vary for other reasons (e.g. the presence of other components, or to allow connection of other components to the tubing 110) but generally the temperature sensor modules 120 at least do not cause the outer profile or diameter of the tubing 110 to vary.

The temperature sensor modules 120a, 120b, 120c . . . 120n are electrically connected to an electrical network 115 to in use allow measuring of the respective electrical properties of the temperature sensors to infer a thermal characteristic thereof. The apparatus 100 further comprises a control module 130 that electrically connected to the temperature sensor modules 120a, 120b, 120c . . . 120n via the electrical network 115. The control module 130 is arranged to in use receive and process an electrical signal associated with the temperature sensor modules 120a, 120b, 120c . . . 120n to enable inference of the temperature thereof and the environment to which the tubing is exposed at the location of that temperature sensor module. A resistive heating element (not shown) may be provided in the tubing 110 alongside temperature sensor modules 120a, 120b, 120c . . . 120n to heat the temperature sensor modules 120a, 120b, 120c . . . 120n in use in order to gauge, e.g. a heating or cooling effect by a flow of the surrounding fluid in the wellbore. Where a separate heating element is not provided, other suitable mechanisms for heating the temperature sensor modules 120a, 120b, 120c . . . 120n may be used, such as self heating by applying a high current through a suitable resistive element or electronic component provided on the temperature sensor in the electrical network with the crystal oscillators.

The apparatus 100 also comprises a power source 140 and a communications module 150 that are provided together with the control module 130 in a module housing 160. The module housing 160 is provided at an end of tubing 110, and the tubing 110 is coupled thereto. The module housing 160 may have more than one length of tubing 110 containing temperature sensor modules extending therefrom. For example, the module housing 160 may have picked up tubing 110 extending from opposite sides thereof such that it is provided the middle of the apparatus 100 for sensing temperature along a wellbore. In the embodiment shown, a single control module 150 is provided. In alternative embodiments, multiple control modules may be provided, wherein individual control modules control sets of temperature sensor modules, and the control modules may be linked to one or more master control modules.

The power source 140 is coupled to the control module 130, temperature sensor modules 120a, 120b, 120c . . . 120n via the control module 130, and the communications module 150, and is configured to provide operational electrical power thereto in use. The power source 140 is arranged to be provided as an in-well power source (i.e. the power is generated or sourced locally to the apparatus in the well, preferably without any wired link to a remote power source) in use and is provided as a battery pack comprising a plurality of primary cells, such as lithium-based cells, which provide capacity sufficient to power the apparatus 100 throughout its usable life. Alternatively, or in addition, in other embodiments the power source 140 may also comprise secondary, rechargeable cells, and/or a downhole power generation unit, such as a turbine. The battery may be at least one of a high temperature lithium thionyl chloride battery and a lithium sulphuryl chloride battery. High temperature batteries are those operable above 85° C. and sometimes above 100° C. Further still, in other implementations the apparatus 100 may alternatively or in addition be configured to be powered in use from a remote power source coupled wirelessly, e.g., by via inductive or capacitive coupling, such that the downhole power source 140 may or may not need to be provided. In use, the remote power source may be located at a position higher in the well, or at the surface.

The communications module 150 is configured to transmit, in use, e.g. to the surface, signals indicative of a temperature sensed in the wellbore by one or more temperature sensor modules 120a, 120b, 120c . . . 120n of the apparatus. The transmitted signals indicative of a temperature sensed in the wellbore may be immediately representative of the measured temperatures (whether that is absolute or relative temperatures), meaning that the control module 130 has performed processing to evaluate the temperature data, although further processing of the temperature data may still be needed at the surface to refine or analyse the results. Alternatively, the transmitted signals indicative of a temperature sensed in the wellbore may be in a more "raw" form and require further processing at the surface in order to reveal the measured temperatures (whether that is absolute or relative temperatures).

The communications module 150 is a wireless data communication module arranged to, in use, wirelessly transmit along the well the signals indicative of a temperature sensed in the wellbore by the apparatus.

Preferably the wireless signals are such that they are capable of passing through a barrier, such as a plug or said annular sealing device, when fixed in place. Preferably therefore the wireless signals are transmitted in at least one of the following forms: electromagnetic (EM), acoustic, coded pressure pulsing and inductively coupled tubulars.

The signals may be data or control signals which need not be in the same wireless form. Accordingly, the options set out herein for different types of wireless signals are independently applicable to data and control signals. The control signals can control downhole devices including sensors. Data from sensors may be transmitted in response to a control signal. Moreover data acquisition and/or transmission parameters, such as acquisition and/or transmission rate or resolution, may be varied using suitable control signals.

EM/Acoustic and coded pressure pulsing use the well, borehole or formation as the medium of transmission. The EM/acoustic or pressure signal may be sent from the well, or from the surface. If provided in the well, an EM/acoustic signal can travel through any annular sealing device, although for certain embodiments, it may travel indirectly, for example around any annular sealing device.

Electromagnetic and acoustic signals are especially preferred—they can transmit through/past an annular sealing device or annular barrier without special inductively coupled tubulars infrastructure, and for data transmission, the amount of information that can be transmitted is normally higher compared to coded pressure pulsing, especially receiving information, such as data, from the well.

Therefore, the communication device may comprise an acoustic communication device and the wireless control signal comprises an acoustic control signal and/or the communication device may comprise an electromagnetic communication device and the wireless control signal comprises an electromagnetic control signal.

Similarly the transmitters and receivers used correspond with the type of wireless signals used. For example an acoustic transmitter and receiver are used if acoustic signals are used.

Thus, the EM/acoustic or pressure wireless signals can be conveyed a relatively long distance as wireless signals, sent for at least 200 m, optionally more than 400 m or longer which is a clear benefit over other short range signals. Embodiments including inductively coupled tubulars provide this advantage/effect by the combination of the integral wire and the inductive couplings. The distance travelled may be much longer, depending on the length of the well.

Data and commands within the signal may be relayed or transmitted by other means. Thus the wireless signals could be converted to other types of wireless or wired signals, and optionally relayed, by the same or by other means, such as hydraulic, electrical and fibre optic lines. In one embodiment, the signals may be transmitted through a cable for a first distance, such as over 400 m, and then transmitted via acoustic or EM communications for a smaller distance, such as 200 m. In another embodiment they are transmitted for 500 m using coded pressure pulsing and then 1000 m using a hydraulic line.

Thus whilst non-wireless means may be used to transmit the signal in addition to the wireless means, preferred configurations preferentially use wireless communication. Thus, whilst the distance travelled by the signal is dependent on the depth of the well, often the wireless signal, including relays but not including any non-wireless transmission, travel for more than 1000 m or more than 2000 m. Preferred embodiments also have signals transferred by wireless signals (including relays but not including non-wireless means) at least half the distance from the surface of the well to the apparatus.

Different wireless signals may be used in the same well for communications going from the well towards the surface, and for communications going from the surface into the well.

Thus, the wireless signal may be sent to the communication device, directly or indirectly, for example making use of in-well relays above and/or below any annular sealing device. The wireless signal may be sent from the surface or from a wireline/coiled tubing (or tractor) run probe at any point in the well above any annular sealing device. For certain embodiments, the probe may be positioned relatively close to any annular sealing device for example less than 30 m therefrom, or less than 15 m.

The abovementioned wireless signal transmission techniques will now be briefly described in turn.

Inductively Coupled Tubulars

Where inductively coupled tubulars are used, there are normally at least ten, usually many more, individual lengths of inductively coupled tubular which are joined together in use, to form a string of inductively coupled tubulars. They have an integral wire and may be formed of tubulars such as tubing drill pipe or casing. At each connection between adjacent lengths there is an inductive coupling. The inductively coupled tubulars that may be used can be provided by N O V under the brand Intellipipe®.

Coded Pressure Pulses

Pressure pulses include methods of communicating from/to within the well/borehole, from/to at least one of a further location within the well/borehole, and the surface of the well/borehole, using positive and/or negative pressure changes, and/or flow rate changes of a fluid in a tubular and/or annular space.

Coded pressure pulses are such pressure pulses where a modulation scheme has been used to encode commands and/or data within the pressure or flow rate variations and a transducer is used within the well/borehole to detect and/or generate the variations, and/or an electronic system is used within the well/borehole to encode and/or decode commands and/or the data. Therefore, pressure pulses used with an in-well/borehole electronic interface are herein defined as coded pressure pulses.

Where coded pressure pulses are used to transmit control signals, various modulation schemes may be used to encode data such as rate of pressure change, on/off keyed (OOK), pulse position modulation (PPM), pulse width modulation (PWM), frequency shift keying (FSK), pressure shift keying (PSK), amplitude shift keying (ASK), combinations of modulation schemes may also be used, for example, OOK-PPM-PWM. Data rates for coded pressure modulation schemes are generally low, typically less than 10 bps, and may be less than 0.1 bps. An advantage of coded pressure pulses, as defined herein, is that they can be sent to electronic interfaces and may provide greater data rate and/or bandwidth than pressure pulses sent to mechanical interfaces.

Coded pressure pulses can be induced in static or flowing fluids and may be detected by directly or indirectly measuring changes in pressure and/or flow rate. Fluids include liquids, gasses and multiphase fluids, and may be static control fluids, and/or fluids being produced from or injected in to the well.

Acoustic

Acoustic signals and communication may include transmission through vibration of the structure of the well including tubulars, casing, liner, drill pipe, drill collars, tubing, coil tubing, sucker rod, downhole tools; transmission via fluid (including through gas), including transmission through fluids in uncased sections of the well, within tubulars, and within annular spaces; transmission through static or flowing fluids; mechanical transmission through wireline, slickline or coiled rod; transmission through the earth; transmission through wellhead equipment. Communication through the structure and/or through the fluid are preferred.

Acoustic transmission may be at sub-sonic (<20 Hz), sonic (20 Hz-20 kHz), and ultrasonic frequencies (20 kHz-2 MHz). Preferably the acoustic transmission is sonic (20 Hz-20 khz).

The acoustic signals and communications may include Frequency Shift Keying (FSK) and/or Phase Shift Keying (PSK) modulation methods, and/or more advanced derivatives of these methods, such as Quadrature Phase Shift Keying (QPSK) or Quadrature Amplitude Modulation (QAM), and preferably incorporating Spread Spectrum Techniques. Typically they are adapted to automatically tune acoustic signalling frequencies and methods to suit well conditions.

The acoustic signals and communications may be uni-directional or bi-directional. Piezoelectric, moving coil transducer or magnetostrictive transducers may be used to send and/or receive the signal.

EM

Electromagnetic (EM) (sometimes referred to as Quasi-Static (QS)) wireless communication is normally in the frequency bands of: (selected based on propagation characteristics)

sub-ELF (extremely low frequency)<3 Hz (normally above 0.01 Hz);
ELF 3 Hz to 30 Hz;
SLF (super low frequency) 30 Hz to 300 Hz;
ULF (ultra low frequency) 300 Hz to 3 kHz; and,
VLF (very low frequency) 3 kHz to 30 kHz.

An exception to the above frequencies is EM communication using the pipe as a wave guide, particularly, but not exclusively when the pipe is gas filled, in which case frequencies from 30 kHz to 30 GHz may typically be used dependent on the pipe size, the fluid in the pipe, and the range of communication. The fluid in the pipe is preferably non-conductive. U.S. Pat. No. 5,831,549 describes a telemetry system involving gigahertz transmission in a gas filled tubular waveguide.

Sub-ELF and/or ELF are preferred for communications from a well to the surface (e.g. over a distance of above 100 m). For more local communications, for example less than 10 m, VLF is preferred. The nomenclature used for these ranges is defined by the International Telecommunication Union (ITU).

EM communications may include transmitting data by one or more of the following: imposing a modulated current on an elongate member and using the earth as return; transmitting current in one tubular and providing a return path in a second tubular; use of a second well as part of a current path; near-field or far-field transmission; creating a current loop within a portion of the well metalwork in order to create a potential difference between the metalwork and earth; use of spaced contacts to create an electric dipole transmitter; use of a toroidal transformer to impose current in the well metalwork; use of an insulating sub; a coil antenna to create a modulated time varying magnetic field for local or through formation transmission; transmission within the well casing; use of the elongate member and earth as a coaxial transmission line; use of a tubular as a wave guide; transmission outwith the well casing.

Especially useful is imposing a modulated current on an elongate member and using the earth as return; creating a current loop within a portion of the well metalwork in order to create a potential difference between the metalwork and earth; use of spaced contacts to create an electric dipole transmitter; and use of a toroidal transformer to impose current in the well metalwork.

To control and direct current advantageously, a number of different techniques may be used. For example one or more of: use of an insulating coating or spacers on well tubulars; selection of well control fluids or cements within or outwith tubulars to electrically conduct with or insulate tubulars; use of a toroid of high magnetic permeability to create inductance and hence an impedance; use of an insulated wire, cable or insulated elongate conductor for part of the transmission path or antenna; use of a tubular as a circular waveguide, using SHF (3 GHz to 30 GHz) and UHF (300 MHz to 3 GHz) frequency bands.

Suitable means for receiving the transmitted signal are also provided, these may include detection of a current flow; detection of a potential difference; use of a dipole antenna; use of a coil antenna; use of a toroidal transformer; use of a Hall effect or similar magnetic field detector; use of sections of the well metalwork as part of a dipole antenna.

Where the phrase "elongate member" is used, for the purposes of EM transmission, this could also mean any elongate electrical conductor including: liner; casing; tubing or tubular; coil tubing; sucker rod; wireline; slickline or coiled rod.

A means to communicate signals within a well with electrically conductive casing is disclosed in U.S. Pat. No. 5,394,141 by Soulier and U.S. Pat. No. 5,576,703 by MacLeod et al both of which are incorporated herein by reference in their entirety. A transmitter comprising oscillator and power amplifier is connected to spaced contacts at a first location inside the finite resistivity casing to form an electric dipole due to the potential difference created by the current flowing between the contacts as a primary load for the power amplifier. This potential difference creates an electric field external to the dipole which can be detected by either a second pair of spaced contacts and amplifier at a second location due to resulting current flow in the casing or alternatively at the surface between a wellhead and an earth reference electrode.

Relay

A relay comprises a transceiver (or receiver) which can receive a signal, and an amplifier which amplifies the signal for the transceiver (or a transmitter) to transmit it onwards.

There may be at least one relay. The at least one relay (and the transceivers or transmitters associated with the apparatus or at the surface) may be operable to transmit a signal for at least 200 m through the well. One or more relays may be configured to transmit for over 300 m, or over 400 m.

For acoustic communication there may be more than five, or more than ten relays, depending on the depth of the well and the position of the apparatus.

Generally, less relays are required for EM communications. For example, there may be only a single relay. Optionally therefore, an EM relay (and the transceivers or transmitters associated with the apparatus or at the surface) may be configured to transmit for over 500 m, or over 1000 m.

The transmission may be more inhibited in some areas of the well, for example when transmitting across a packer. In this case, the relayed signal may travel a shorter distance. However, where a plurality of acoustic relays are provided, preferably at least three are operable to transmit a signal for at least 200 m through the well.

For inductively coupled pipe, a relay may also be provided, for example every 300-500 m in the well.

The relays may keep at least a proportion of the data for later retrieval in a suitable memory means.

Taking these factors into account, and also the nature of the well, the relays can therefore be spaced apart accordingly in the well.

The wireless signals may cause, in effect, immediate activation, or may be configured to activate the apparatus after a time delay, and/or if other conditions are present such as a particular pressure change.

The apparatus 100, in particular temperature sensor modules 120a . . . n, the control module 130 and/or the communications module 150, may comprises one or more microprocessors. Electronics in the apparatus, to power various components such as the microprocessor, control and communication systems, are preferably low power electronics. Low power electronics can incorporate features such as low voltage microcontrollers, and the use of 'sleep' modes where the majority of the electronic systems are powered off and a low frequency oscillator, such as a 10-100 kHz, for example 32 kHz, oscillator used to maintain system timing and 'wake-up' functions. Synchronised short range wireless (for example EM in the VLF range) communication techniques can be used between different components of the system to minimize the time that individual components need to be kept 'awake', and hence maximise 'sleep' time and power saving.

The low power electronics facilitates long term use of various components of the apparatus. The control mechanism may be configured to be controllable by the wireless control signal up to more than 24 hours after being run into the well, optionally more than 7 days, more than 1 month, or more than 1 year or more than 5 years. It can be configured to remain dormant before and/or after being activated.

In this way, by the use of an in-well power source 140 and a wireless communications module 150 and/or a memory device for wirelessly conveying/locally storing data including sensor data, the apparatus 100 for use in sensing a temperature along a wellbore may be configured to operate as an "autonomous" system downhole. The apparatus may include one or more housings or enclosures supporting one or more of the in-well power source 140, wireless communications module 150 and/or memory device such that it is configured as an autonomous system for installation downhole. In these configurations, the apparatus may, in use, require no cabling to receive power from or transmit signals to the surface. This means that the apparatus 100 can be reliable and easy to deploy, and in addition, where only a short section of the well is being measured, cabling and apparatus needs only to be provided in the region of the well under test. That is unlike the prior art fibre optic temperature sensor systems and the WellWatcher Flux™ in which cabling needs to be provided all the way from the sensed location to the surface, which can be incredibly inconvenient and problematic where, for example, the temperature of a short section of the well (say 20 m long) needs to be tested at a well depth of greater than 500 m, which itself is subsea at a depth of 3 km from the water surface. Using the apparatus 100, only a short, 20 m long length of tubing 110 and the module housing 160 needs to be provided in the well, whereas in the prior art, cabling over 3.5 km is needed to obtain a sensed temperature in the 20 m section of the wellbore.

In that respect, the tubing 110 is typically 10 to 200 metres in length, and the temperature sensor modules are typically spaced in the tubing at a spacing distance in the range 0.25 to 10 metres. The length of the tubing and spacing of the sensor modules can be chosen so as to obtain a desired measurement span and spatial resolution. While the tubing 110 shown in FIG. 1 is "straight" in that it is arranged to extend along the wellbore substantially along the axis of the wellbore, in other embodiments the tubing 110 can be arranged as a ring or helix to extend around a tubular element of a well apparatus. Here, the tubing length and/or sensor spacing can be shorter, and the apparatus in this arrangement can reveal information about the azimuthal variation in sensed temperature at locations in the wellbore, which can be reveal information about a direction of flow of fluid in the wellbore.

Figure 2:
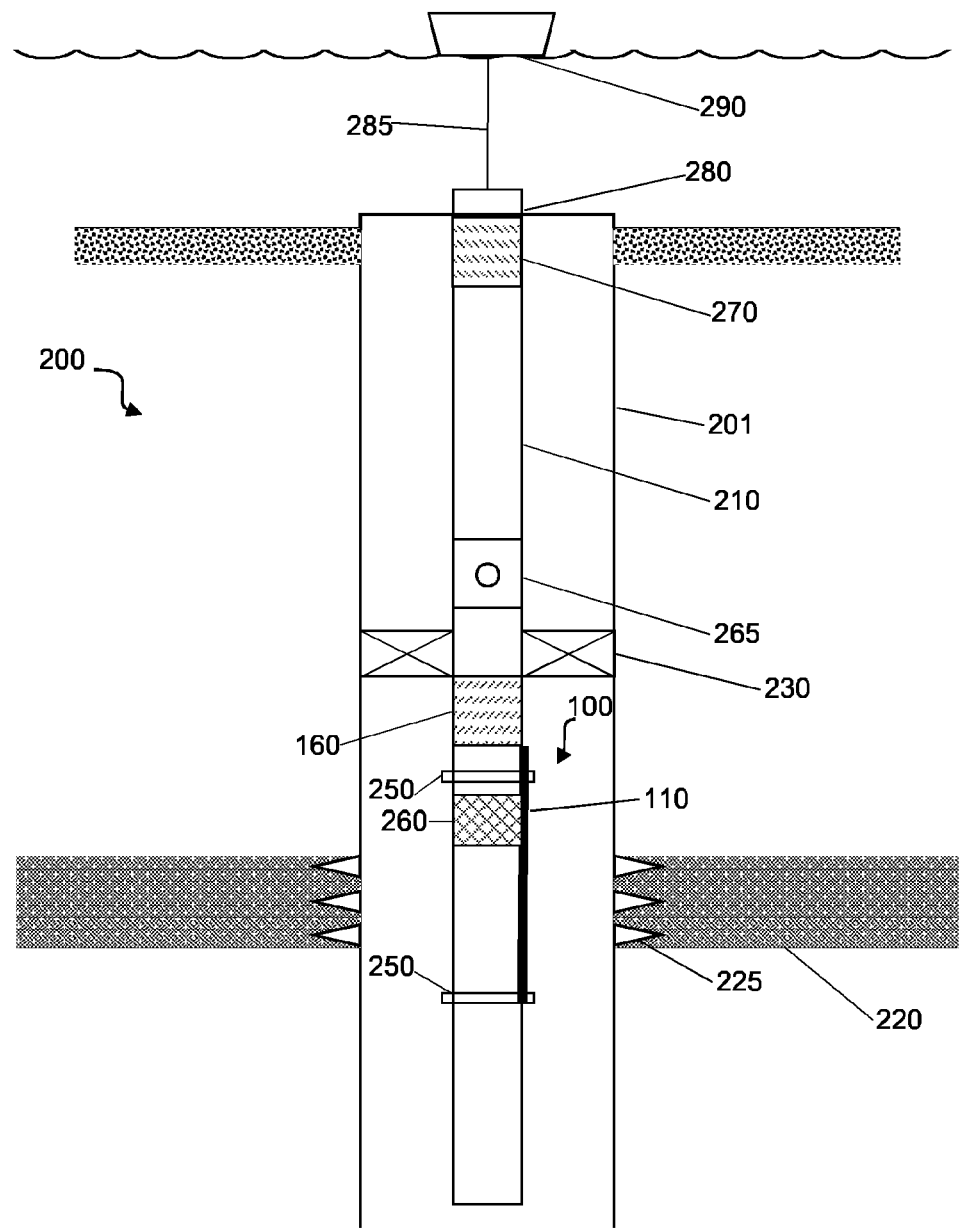
FIG. 2 shows a schematic illustration of a typical deployment of the apparatus shown in FIG. 1 in a subsea well.

Reference will now be made to FIG. 2, which shows a typical deployment of the apparatus 100 shown in FIG. 1 in a subsea well 200.

The well 200 comprises a wellbore 201 that has been drilled using a drillship or semisubmersible rig and which has been subsequently lined and cased (not shown). By wellbore in this disclosure it is meant, as necessary, the inward-facing wall of a drilled openhole well, or the or part of the void defined thereby, or, as context requires, even the inward-facing surface of a casing of a cased well, or the or part of the void defined thereby. The wellbore 201 is often an at least partially vertical well. Nevertheless, it can be a deviated or horizontal well. References such as "above" and below" when applied to deviated or horizontal wells should be construed as their equivalent in wells with some vertical orientation. For example, "above" is closer to the surface of the well.

A drill stem test is now being performed using a tubular element provided by a drill stem test (DST) string 210 in which the drill bit has been removed from the drill string and replaced with testing and sensing equipment such as a sensor string 210 run into the well to assess the geological formations 220.

A redeployable packer is provided as an annular seal 230 arranged above a formation 220 to be tested. Perforations 225 through the casing and into the formation 220 have been formed to stimulate a flow of product.

The apparatus 100 shown in FIG. 1 for sensing a temperature in a wellbore is provided in the DST string 210 arranged below the annular sealing device 230 such that the tubing 110 is not required to traverse the seal. The module housing 160 is annularly configured to permit flow there through and is arranged in the string 210 below the annular seal 230 and the tubing 110 runs along the outer surface of the string 210 (e.g. in a groove) along the wellbore and is clamped thereto using clamps 250. The clamps 250 may be configured to act as straps, to strap the tubing 110 to the string 210.

In another embodiment (not shown) a gun module comprising a series of shaped charges may be provided in the string 210 which, in use, is fired to form perforations 225 through the casing and into the formation 220 to stimulate a flow of product. Further clamps (not shown) may be provided, in particular, along the perforating gun, to ensure that the tubing is retained clear of the perforating charges. After use, the apparatus 100 may be discarded, for example, together with spent guns.

A ported sleeve 260 is provided, opening the cased hole into the tubular element of the drill string 210, through which, upon opening of the valve 265, product is permitted to flow under pressure from the perforations 225 in the formation 220 into the tubular element of the DST string 210 to the wellhead 280, which is sealed by a blow out preventer (BOP), or the like, provided at the surface of the well. The surface of the well is the top of the uppermost casing of the well.

As the product flows, the temperature sensor modules 120*a*, 120*b*, 120*c* . . . 120*n* of the apparatus 100 are sensing the temperature in the cased well and generating electrical signals that are received and processed by the control module 130 via the electrical network 115. The communications module 130 then generates a signal indicative of the temperature at one or more of the temperature sensor modules 120*a*, 120*b*, 120*c* . . . 120*n* which is then processed by the communications module 150 and encoded into acoustic pulses and transmitted along the DST string 210. An acoustic signal receiver 270 located in the DST string at or near the well head 280 detects and decodes the wirelessly transmitted acoustic signal (which may have been conveyed to the well head by a network of relays and repeaters (not shown)). Data or control signals may be relayed between two or more locations above the annular sealing device wirelessly, by wires and/or by fibre optics. Similarly, data or control signals may be relayed between two or more locations below the annular sealing device wirelessly, by wires and/or by fibre optics.

The decoded data signal is then conveyed via an electrical coupling 285 to a rig or ship 290 at the surface where it may be processed further to allow analysis of the sensed temperature data. By analysing the temperature data, detailed information may be obtained indicating the type of fluid flowing in the well, the flow rate and/or the location thereof. If the tubing 110 is arranged around an annular sealing device such as a packer, the heating effect due to fluid flow from leaks can be detected, allowing an identification to be made as to when sealing elements are and are not effective.

Instead of the apparatus 100 for use in sensing temperature in a wellbore being provided entirely below and not extending across the annular sealing device 230, in other arrangements, the tubing 110 may extend across the annular sealing device 230 through a bypass port thereof.

The apparatus 100 may comprise a memory device, which can store data for retrieval at a later time. The data may be retrieved by a variety of methods. For example it may be transmitted wirelessly at a later time, optionally in response to an instruction to transmit. Or it may retrieved by a probe run into the well on wireline/coiled tubing or a tractor. The probe can optionally couple with the memory device physically or wirelessly.

The apparatus may be configured to store and/or transmit sensor data. The storing of the sensor data may only be for a short period such as up to 1 second or 1 minute, 1 hour or 1 day, for example for the purposes of buffering, or alternatively or in addition, the storing of the sensor data may be for longer periods such as at least a day, at least a month at least a year, at least 2 years, or at least 5 years, for the purposes of long term data storage and subsequent recovery, or partial recovery, wirelessly, by a wired connection or by physical retrieval.

While FIG. 2 illustrates one possible configuration, it is to be understood that the apparatus 100 may be provided downhole to sense a temperature thereof in a number of possible configurations. The apparatus 100 can be deployed in the well on wireline, or coiled tubing, and can be set and/or suspended in the well. As noted above, the tubing 110 of the apparatus 100 for use in sensing temperature in a wellbore can in embodiments extend along and/or around the tubular element 210, which is typically for conveying product to the surface or tooling into and out of the wellbore. Instead of being a drill stem test string, in other embodiments the tubular element can be a drill string, a test string, a completion string, a production string, an injection string, a work-over string, an observation string, a suspension string, an abandonment string, a casing string, a fracturing string, a gravel pack string, a screen or a liner. The apparatus 110 may be used in other well operations, such as during production, workovers and other interventions, and during well kill operations. FIG. 2 illustrates a particularly useful example of a use of the apparatus 100 in which the tubing 110 is clamped across a gun, and can be run into the well 201 together with the gun. The apparatus can be deployed with and clamped across a number of different possible downhole tools, and clamping across a drill stem test string is only one possible example. After use, the apparatus 100 may be discarded. On the other hand, the apparatus 100 may instead be retrieved and reused at other locations. In embodiments where no communications unit is provided for wireless transmission of sensed temperature data, the temperature data may instead be logged and stored at the apparatus and recovered later after retrieval of the apparatus from the well.

Arrangements for the construction and operation of the crystal oscillator temperature sensor modules 120*a*, 120*b*, 120*c* . . . 120*n* and the control module 130 to sense temperature, address the sensor modules, and to process and recover temperature information in accordance with embodiments will now be described.

Figure 3:
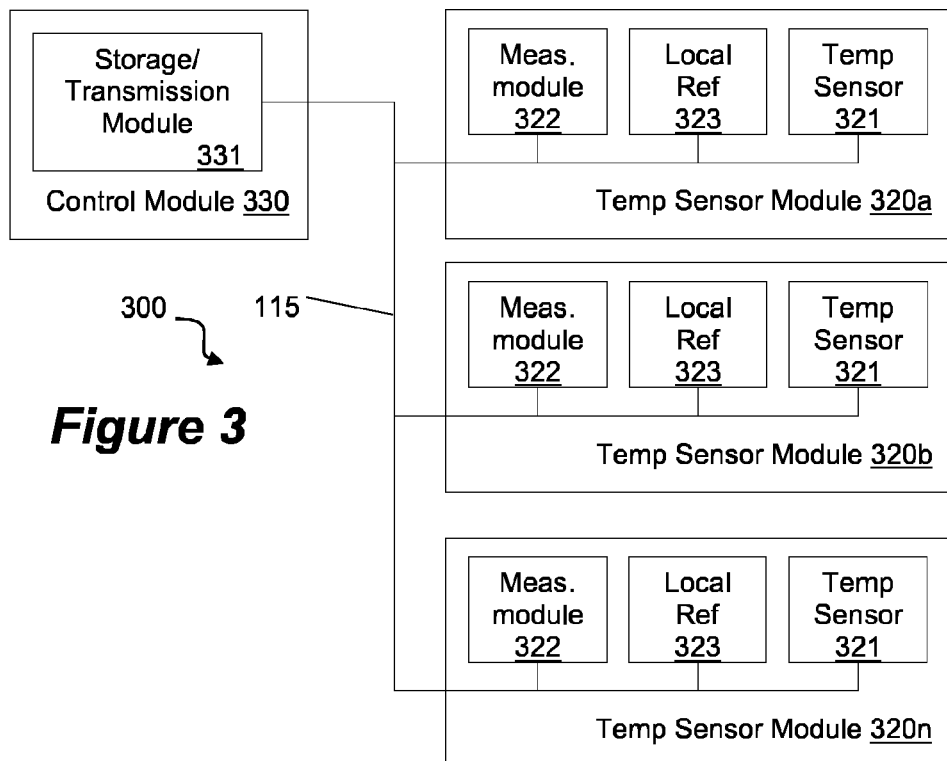
FIG. 3 shows a schematic illustration of an arrangement for the construction and operation of the crystal oscillator temperature sensor modules and the control module of an apparatus as shown in FIG. 1 to sense temperature, address the sensor modules, and to process and recover temperature information therefrom in accordance with another embodiment where local references are used.

One possible arrangement is shown in FIG. 3. Here, the apparatus 300 comprises at least six temperature sensor modules 320a, 320b . . . 320n, of which three are shown, connected to a control module 330. Each temperature sensor module comprises a temperature sensor 321 provided at least in part by at least one crystal oscillator such as a quartz crystal. The temperature sensor 321 has electrical properties that vary with temperature—i.e. its resonant frequency. Each temperature sensor module 320a, 320b, . . . 320n further comprises a measurement module 322 that takes a signal or measures a temperature-dependent electrical property from the temperature sensor 321, compares it with a temperature-calibrated local reference 323 that is arranged to provide a signal against which variations in the temperature from the measurement from the temperature sensor 321 can be revealed by the measurement module 322. The measurement modules 322 thus produce data representative of the temperature measured at each temperature sensor module 320a, 320b . . . 320n and transmit that data to the control module 330 via the electrical network 115. The sensed temperature data can be transmitted to the control module 330 as an analogue signal, where the temperature sensor modules 320a, 320b, . . . 320n are individually isolatable in the electrical network 115 or by which the analogue signals are multiplexed in the same channel in the electrical network. Alternatively, the data can be digitally encoded at the temperature sensor modules 320a, 320b . . . 320n and transmitted to the control module 330 using a digital addressing protocol or by multiplexing, where multiple temperature sensor modules 320a, 320b, . . . 320n use the same channel in the electrical network. Miniaturisation of the sensor module may be achieved by mounting components on a miniature flexible printed circuit and/or application specific integrated circuits (ASICs) can be used.

At the control module 330, a storage and transmission module 331 is provided to effectively buffer the measured temperature data whereupon it can be passed to the communications module 150 for communication to the surface. An advantage of providing a measurement module and local reference at each temperature sensor module is that data can be readily transmitted to the control module 330 and the effect of the electrical network on the signal, such as from noise, and the temperature sensitivity of the wire resistance can be mitigated, and the electrical network can be relatively simple, requiring only one or two wires to convey the data. For example, a suitable digital addressing system, such as the I²C™, SENT or 1-Wire™ protocols may be used to transmit the data from the temperature sensor modules 320a, 320b . . . 320n to the control module 330 using a small number of wires or even only one wire, which may be the power wire that provides power to the temperature sensor modules 320a, 320b . . . 320n.

While the arrangement shown in FIG. 3 is advantageous for use in a range of different circumstances, the inter-sensor stability may not be high as required for some, particularly long term, uses, as the local references at each temperature sensor module can drift over time. What matters in practical applications where information about the flow of fluid in the wellbore is to be revealed by the apparatus, it is the not the monitoring of absolute temperature that is important, but the relative changes in temperature between temperature sensors. Where a degree of inter-sensor drift can occur over time, the relative changes in temperature at the different sensors can be measured less reliably over time of installation. In addition, the provision of the measurement module 322 and local reference 323 (and also a digital input/output controller) at each temperature sensor module 320a, 320b . . . 320n means that the modules 320a, 320b . . . 320n may require significant miniaturisation and sophisticated package design in order to enable them to be stall enough to be integrated within the small diameter tubing 110 without having to mount or weld the temperature sensor modules as larger outer diameter sections in the tubing. Further, the provision of various electronic components within the temperature sensor modules 320a, 320b . . . 320n means that they required increased ruggedisation.

Figure 4:
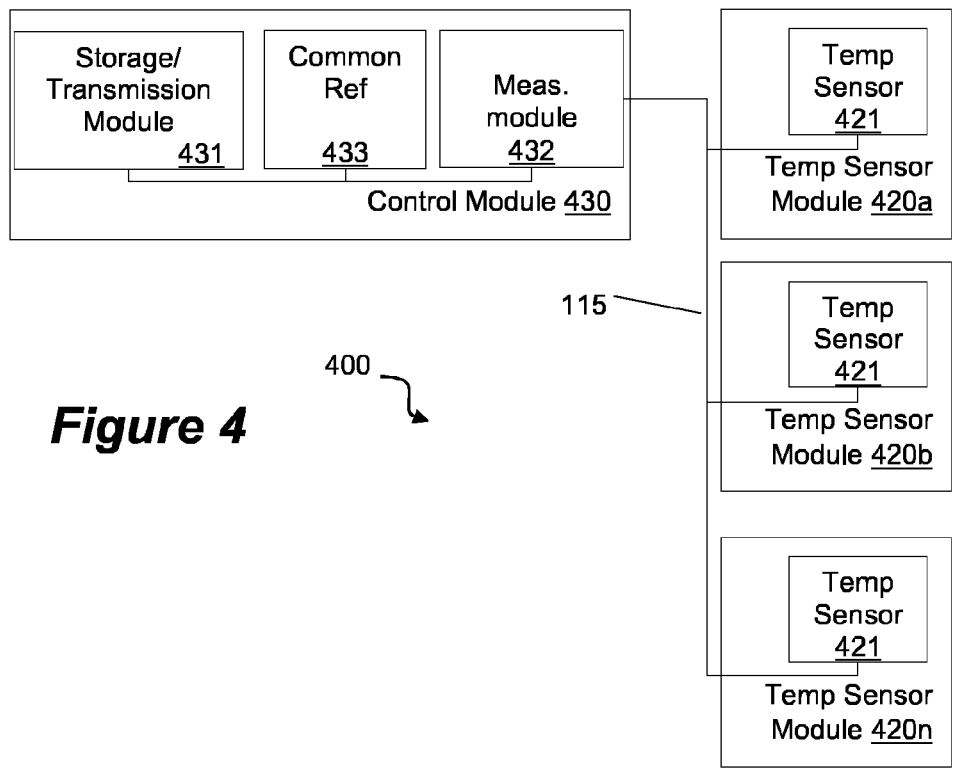
FIG. 4 shows a schematic illustration of an arrangement for the construction and operation of the crystal oscillator temperature sensor modules and the control module of an apparatus as shown in FIG. 1 to sense temperature, address the sensor modules, and to process and recover temperature information therefrom in accordance with another embodiment where a common reference is used.

The arrangement shown in FIG. 4, however, provides an alternative arrangement for the apparatus comprising at least six temperature sensor modules (of which three are shown) that can be of particular use in numerous applications. In the apparatus 400, each temperature sensor module 420a, 420b . . . 420n comprises a temperature sensor 421 provided at least in part by at least one crystal oscillator such as a quartz crystal. The temperature sensor 321 has electrical properties that vary with temperature—i.e. its resonant frequency. The local reference and the measurement module at each temperature sensor module of the apparatus 300 is omitted and instead the control module 430 is provided with a measurement module 432 and a common reference 433 that are used to determine a thermal characteristic of each temperature sensor 421 of each temperature sensor module 420a, 420b . . . 420n. The common reference signal generator is a reference oscillator. Here, the use of a reference common to all temperature sensor modules 420a, 420b . . . 420n located at the control module 430 allows the apparatus to provide a relatively high inter-sensor stability as compared to the arrangement shown in FIG. 3, with relatively low drift. Positioning of the reference sensor at the control module also permits a larger reference crystal to be used which is advantageous in selecting a reference which is stable against temperature, and stable over time and repeated temperature cycling. This provides the apparatus 400 with a high accuracy and reliability of sensed temperature changes across the length of the tubing 110 over time. The provision of a common reference allows the apparatus 400 of this embodiment to be accurate and reliable for the measurement of the relative changes between the sensors, which is what is important where information is to be gathered about the flow rate and nature of fluids in the wellbore. In addition, the measurement module 432 and common reference 433 are provided in the control module 430 itself, meaning that the temperature sensor modules 420a, 420b . . . 420n do not need to include these components. While, as will be explained with reference to FIG. 8, in embodiments, the temperature sensor modules can comprise digital counters and FPGAs, in other embodiments, the temperature sensor modules 420a, 420b . . . 420n may include no electronic components other than the temperature sensor 421, which may be provided only the crystal oscillator (and any necessary electrical interconnects and packaging). As a result, the temperature sensor modules 420a, 420b . . . 420n can be very small, which allows the temperature sensor components to be easily integrated into the small diameter tubing 110. Further still, as the relatively sensitive electronic components of the measurement module 432 and common reference 433 are provided in the control module 430 itself, the temperature sensor modules 420a, 420b . . . 420n can be more rugged. This is particularly the case where appropriately rugged temperature sensors 421 are used and packaged and protected using a potting compound and/or where the tubing 110 is filled with a liquid such as an oil. Further still, the sensor string 410 is relatively simple and cost effective to manufacture, with the temperature sensor modules each being small with very few components and so easy to integrate within the small diameter tubing, and for the control electronics to be provided in a separately assembled control module provided, for example, at an end of or adjacent the tubing.

While FIG. 4 shows the common reference signal generator being used as a reference for the signal indicative of the measurement of the temperature sensed by each of the temperature sensor modules, in embodiments, the common reference generator may be used as a reference for the measurement in relation to fewer than all but at least two of the temperature sensors.

In FIG. 4, the measurement module 432 is located in the control module 430, remote from the temperature sensor modules 420a, 420b . . . 420n. The measurement module 432 may be configured to measure an analogue electrical characteristic of the temperature sensors 421 at a distance, by addressing or connecting exclusively to a temperature sensor 421 of a specific temperature sensor module 420a, 420b . . . 420n through the electrical network 115, or otherwise discerning the electrical characteristic of a particular temperature sensor 421 in a measured analogue signal. This may be achieved by providing the electrical network 115 configured so as to allow the receiving and processing of an separate analogue signal from the different temperature sensors 421 at the control module 430. An example of a suitable electrical network configuration is described below with reference to FIG. 7. Alternatively, the signal indicative of the measurement of the temperature sensed by the temperature sensor modules may be represented by a voltage and/or current or other characteristic of the generated signal, such as the signal duration, or the signal may digitally encode the sensed temperature. In order to convey the electrical signal indicative of the temperature sensed by the temperature sensors 421 to the control module 430 for receipt and processing by the measurement module 432, in embodiments, a digital addressing system could again be used whereby each temperature sensor module 420a, 420b . . . 420n is provided with a digital encoder module (not shown) whereby a signal based on the common reference is passed to the temperature sensor modules and an electrical signal sensed by the temperature sensor 421 is digitised and conveyed as digitally encoded data to the control module using an appropriate digital communication protocol.

Alternatively, a hybrid of FIGS. 3 and 4 may be used (not shown), where a common reference at the control module is supplied to each temperature sensor module, and a measurement module provided at each temperature sensor module. A digital signal representative of temperature can be used to communicate the measurement to the control module.

Figure 5:
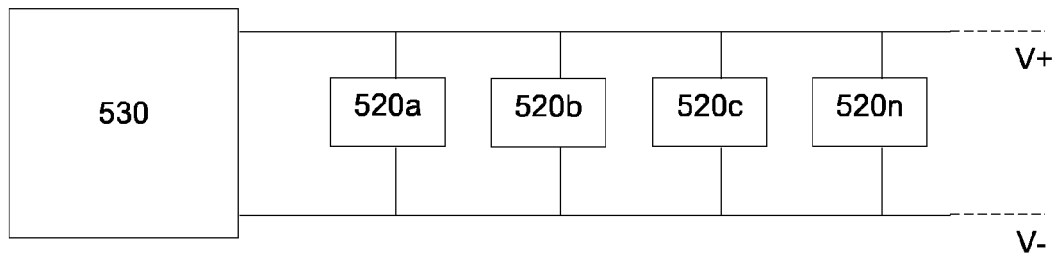
FIG. 5 shows a schematic illustration of an arrangement for the apparatus in accordance with one embodiment for digitally connecting the crystal oscillator temperature sensor modules to the control module using a power rail wire.
Figure 6:
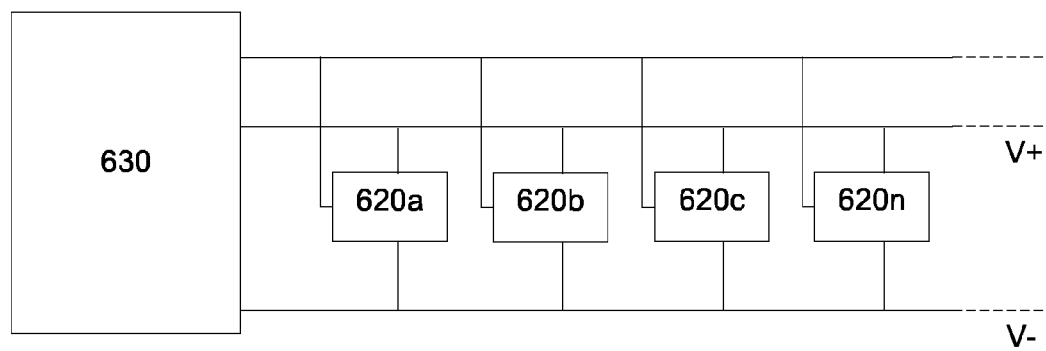
FIG. 6 shows a schematic illustration of an arrangement for the apparatus in accordance with another embodiment for digitally connecting the crystal oscillator temperature sensor modules to the control module using a common third wire.
Figure 7:
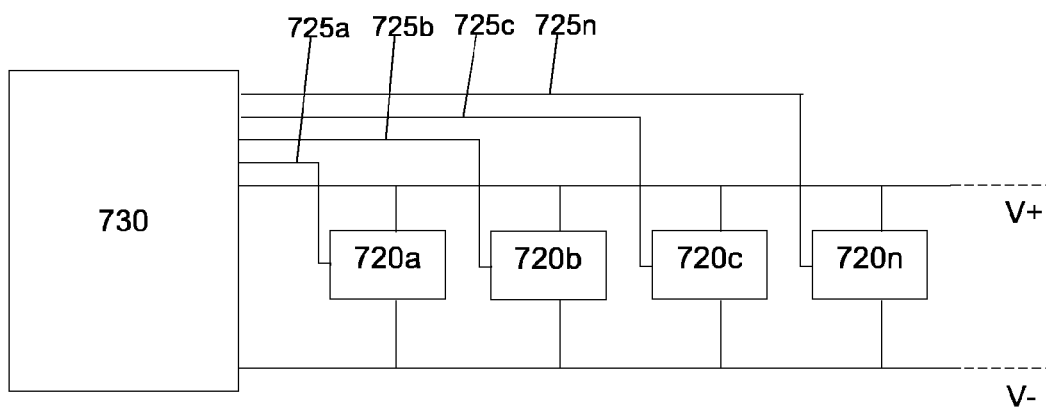
FIG. 7 shows a schematic illustration of an arrangement for the apparatus in accordance with an embodiment for connecting the crystal oscillator temperature sensor modules to the control module to receive an analogue signal therefrom using individual wires.

Indeed, FIGS. 5 and 6 show arrangements for digitally connecting the temperature sensor modules to the control module, whereas FIG. 7 shows a method of addressing the temperature sensors and receiving and processing analogue signals therefrom at the control module.

In the FIG. 5 arrangement, a series of at least six crystal oscillator temperature sensor modules 520a, 520b, 520c . . . 520n, of which four are shown, are connected by connecting them in parallel between two power supply rails providing voltages V+, V− from the control module 530. The temperature sensor modules 520a, 520b, 520c . . . 520n are provided with digital encoders configured to transmit signals indicative of the measurement by the temperature sensor (whether that is a temperature measurement, or an electrical signal as-yet unprocessed to indicative of a measured thermal characteristic) to the control module 530 by modulating the signal on one or both of the power rails, in accordance with a suitable digital communication protocol.

One possible elegant implementation of the arrangement shown in FIG. 5 to allow digital communication with the temperature sensor modules would be to couple the temperature sensor modules inside the length of the tubing 110 using a wire, and to couple each of the temperature sensor modules to the body of the tubing itself to use the tubing body as the return path for the signal.

In the FIG. 6 arrangement, a series of at least six crystal oscillator temperature sensor modules 620a, 620b, 620c . . . 620n, of which four are shown, are connected by connecting them in parallel between two power supply rails providing voltages V+, V− from the control module 630. The temperature sensor modules 620a, 620b, 620c . . . 620n are provided with digital encoders configured to transmit signals indicative of the measurement by the temperature sensor (whether that is a temperature measurement, or an electrical signal as-yet unprocessed to indicative of a measured thermal characteristic) to the control module 630 by modulating the signal on a common (third) wire, in accordance with a suitable communication protocol.

Alternatively, in the arrangement shown in FIG. 6, the temperature sensor modules 620a, 620b, 620c . . . 620n can be addressed digitally by the control module 630, using a suitable digital communication channel over the two power supply rails, and the temperature sensor modules 620a, 620b, 620c . . . 620n may be configured to provide an analogue signal to the control module 630 in response using the third wire.

In accordance with the digital communication arrangements illustrated in FIGS. 5 and 6, a large number of temperature sensor modules (limited by the addressing capacity of the protocol used) can be connected in parallel into the electrical network requiring only a small number of wires. This allows the length of the tubing 110 over which the temperature sensitive array can be spread to be long and/or the spatial resolution that can be achieved by narrowly spacing the temperature sensor modules to be high. These arrangements allow the number of temperature sensor modules to be provided in the tubing to be very high.

Where analogue signals are to be transmitted to the control module without digital addressing or multiplexing, separate wires can be used. Thus, in the FIG. 7 arrangement, a series of at least six temperature sensor modules 720a, 720b, 720c . . . 720n, of which four are shown, are connected between two power supply rails providing voltages V+, V− from the control module 730. The temperature sensor modules 720a, 720b, 720c . . . 720n, in response to the applied voltage V+, V−, provide on separate wires 725a, 725b, 725c . . . 725n signals indicative of the measurement by the temperature sensor (whether that is a temperature measurement, or an electrical signal as-yet unprocessed to indicative of a measured thermal characteristic) that is received and processed at the control module 730 via the separate wires 725a, 725b, 725c . . . 725n. The control module 730 may process the received electrical signals to determine a temperature measure.

In the arrangement shown in FIG. 7, for each additional sensor that is added to the array, an additional wire is required. In a normal 19 core wire bundle that can be fitted into small diameter tubing, this would limit the number of sensors that could be provided. However, the arrangement shown in FIG. 7 could be combined with the arrangement shown in FIG. 6 whereby multiple, digitally addressed, temperature sensor modules are provided common to each return wire.

Figure 8:
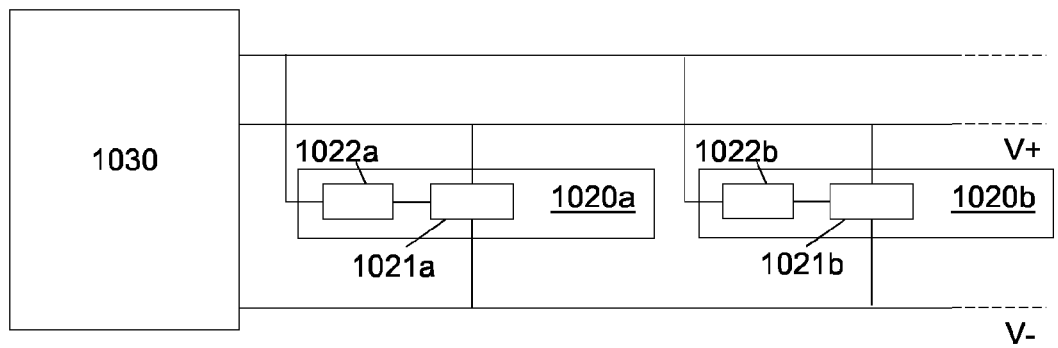
FIG. 8 shows a schematic illustration of an arrangement for the apparatus in accordance with an embodiment an embodiment that uses oscillating crystal temperature sensors.
Figure 9:
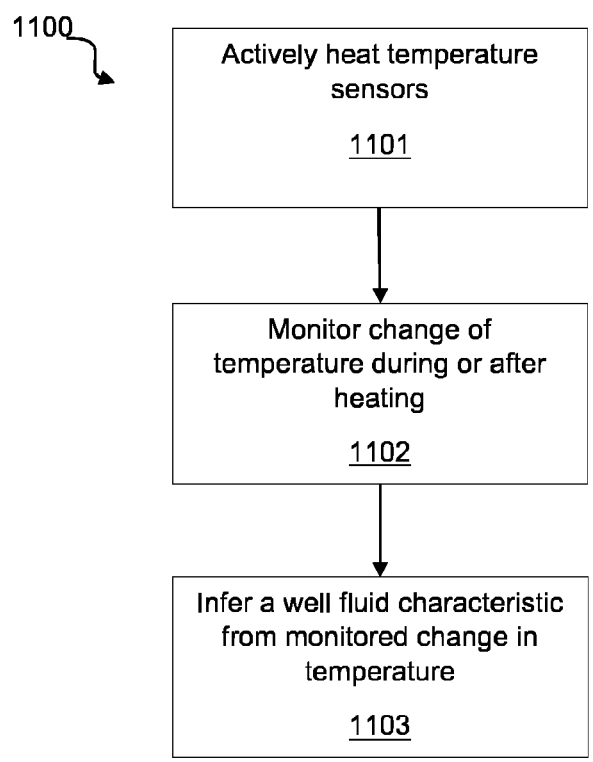
FIG. 9 is a process flow diagram showing a method of operation of apparatus described above in relation to FIGS. 1-8 to determine a temperature along a wellbore.

An explanation of the use of crystal oscillators as temperature sensors in an embodiment of the apparatus for sensing temperature along a wellbore to provide accurate, high resolution temperature measurements that provide high inter-sensor stability over the long term, will now be provided with reference to FIG. 8. Here, each of at least six temperature sensor modules 1020a, 1020b of which two are shown, comprises a temperature sensor comprising a crystal oscillator, such as a quartz oscillator, having an electrical oscillation frequency that varies with temperature. The temperature sensor modules 1020a, 1020b are compact due to the small size of the crystal oscillator and so can be fitted into small diameter tube 110 while allowing a smooth outer profile thereof. When the voltage is applied from the control module 1030, each temperature sensor module 1020a, 1020b oscillates at a characteristic frequency that varies dependent on temperature. As the dependency of the frequency produced on the applied voltage is low, the effect of the wire resistance on the temperature measurements is also low. As a result, the temperature can be accurately and stably measured for each temperature sensor module 1020a, 1020b, at the control module 1030 in the following way. Each temperature sensor module 1020a, 1020b, is provided with a digital counter and microprocessor at in the form of, e.g., at gate array 1022a, 1022b coupled to the crystal oscillator 1021a, 1021b, and for counting the number of oscillations over a period defined by a timing signal generated by the reference oscillator at the control module. The reference oscillator is an oscillator whose frequency is relatively stable with temperature, and the temperature sensor oscillator is one whose frequency is dependent on temperature. Thus, with prior calibration, comparing and monitoring the variation between the frequency of the common reference crystal oscillator and the crystal oscillators temperature sensors 1021a, 1021b the temperature and variation of temperature at each temperature sensor module 1020a, 1020b can be accurately monitored.

While the FIG. 8 embodiment shows the use of crystal oscillator temperature sensors in a specific circuit arrangement using digital counters, other arrangements are possible by which the relative frequencies of the common reference crystal oscillator and the crystal oscillators temperature sensors are addressed, retrieved and compared, such as by using arrangements described above in relation to FIGS. 3-7. For example, the apparatus could be configured such that the oscillating electric signals generated by each crystal oscillator temperature sensor are received and processed at the control module, which is configured to determine a thermal characteristic at least one, or each, crystal oscillator by comparing a signal derived from the electrical signal generated by each crystal oscillator temperature sensor with an electrical signal derived from the reference crystal oscillator.

A method 1100 of operation of apparatus described above in relation to FIGS. 1-6 to determine a temperature along a wellbore will now be described with reference to FIG. 7.

Firstly, in step 1101 the temperature sensors in the tubing is actively heated by applying a current through a resistor arranged adjacent the temperature sensor or by using the resistance associated with the temperature sensor module itself, or by self-heating the sensors by applying a current therethrough. For example, a high current could be applied to resistive heating element to heat the temperature sensors. Alternatively, the temperature sensors could be actively cooled, for example, by use of one or more peltier devices, or cooling lines and a heat exchanger.

Then, in step 1102, a change of temperature of the or each sensor is monitored during and/or after heating.

Then, to translate a measured temperature in 1102 into flow information (such as flow rate, an indication of the type of fluid components, etc.), in step 1103, a fluid flow characteristic of the environment to which the tubing is exposed at the locations of the temperature sensors is inferred based on the change of temperature, or on a rate of change of temperature, or the power to create a change in temperature of the sensors during and/or after heating. An indication of the type of fluid components (e.g. gas/oil/water) to which the apparatus 100 is exposed is achievable as the specific heat capacity, thermal conductivity and density of the different fluids lead to differing thermal response when the sensors are heated.

That claimed is:

1. An apparatus for use in sensing temperature along a wellbore, comprising:
   a metallic tubing comprising at least 10 temperature sensor modules provided at locations along the inside of the metallic tubing, each temperature sensor module comprising a temperature sensor, the temperature sensor comprising a crystal oscillator having an electrical oscillation frequency that varies with temperature, the metallic tubing having an external diameter of less than 14 mm at the location of the at least 10 temperature sensor modules; and
   a control module electrically connected to each crystal oscillator and having a reference crystal oscillator common to at least 10 of the temperature sensors.

2. The apparatus as claimed in claim 1, further comprising an electrical network comprising at least 2 of the temperature sensor modules coupled to at least a common wire.

3. The apparatus as claimed in claim 1, wherein the metallic tubing is filled with and encapsulates a non-conducting liquid.

4. The apparatus as claimed in claim 1, wherein the outer diameter of the metallic tubing is the same at locations in the metallic tubing of at least one of the temperature sensor modules and at locations in the metallic tubing away from the at least one of the temperature sensor modules.

5. The apparatus as claimed in claim 1, wherein the outer diameter of the metallic tubing is not increased at the location in the metallic tubing of at least one of the temperature sensor modules.

6. The apparatus as claimed in claim 1, wherein the external profile of the metallic tubing is not changed at the location in the metallic tubing of at least one of the temperature sensor modules.

7. The apparatus as claimed in claim 1, wherein the outer diameter of the metallic tubing remains substantially constant along the metallic tubing.

8. The apparatus as claimed in claim 1, wherein multiple control modules are provided, wherein individual control modules control sets of temperature sensors, and the control modules are linked to at least one master control module.

9. The apparatus as claimed in claim 1, wherein the apparatus is configured to be powered from a position higher in the wellbore.

10. The apparatus as claimed in claim 1, further comprising a wireless data communication module coupled to the apparatus for use in sensing temperature in the wellbore and arranged to:

wirelessly transmit along the wellbore signals indicative of a temperature sensed in the wellbore by the apparatus.

11. The apparatus as claimed in claim 1, wherein the metallic tubing is one of a stainless steel, a duplex stainless steel, a super-duplex stainless steel, a nickel alloy, titanium and a titanium alloy.

12. The apparatus as claimed in claim 1, wherein the crystal oscillators are one of quartz oscillators and piezoceramic oscillators.

13. The apparatus as claimed in claim 1, wherein the metallic tubing external diameter is at least 3 mm and less than 14 mm, at the location in the metallic tubing of at least one of the temperature sensor modules.

14. The apparatus as claimed in claim 13, wherein the external diameter of the metallic tubing is less than 10 mm at the location of at least 10.

15. The apparatus as claimed in claim 1, further comprising a power source configured to provide operational power to the apparatus for sensing temperature in the wellbore, wherein the power source is arranged to be provided as an in-well power source.

16. The apparatus as claimed in claim 15, wherein the power source comprises at least one or more primary cells, one or more secondary cells, and one or more downhole power generators.

17. A well comprising:
a well apparatus having an apparatus for use in sensing temperature in a wellbore to sense a temperature in a wellbore of the well, the apparatus comprising:
a metallic tubing comprising at least 10 temperature sensor modules provided at locations along the inside of the metallic tubing, each temperature sensor module comprising a temperature sensor, each temperature sensor comprising a crystal oscillator having an electrical oscillation frequency that varies with temperature, the metallic tubing having an external diameter of less than 14 mm at the location of the at least 10 temperature sensor modules; and a control module electrically connected to each crystal oscillator and having a reference crystal oscillator common to at least 10 of the temperature sensors.

18. The well as claimed in claim 17, wherein the apparatus is deployed in the well on one of a wireline and coiled tubing.

19. The well as claimed in claim 17, wherein the apparatus is configured to monitor the temperature at a barrier in the well.

20. The well as claimed in claim 17, wherein the apparatus is configured to monitor the well during at least one of a well test and a drill stem test.

21. The well as claimed in claim 17, wherein the well is at least one of a production well and an injection well.

22. The well as claimed in claim 17, wherein the apparatus is configured to monitor an exothermic reaction associated with a fluid treatment of the well.

23. The well as claimed in claim 17, where the well is in at least one of a suspended phase and an abandoned phase, and the apparatus is configured to monitor the well.

24. The well as claimed in claim 17, wherein the well apparatus comprises a tubular element and an annular sealing device provided at least 100 m below a surface of the well, and between one of the wellbore and a casing of the wellbore and a tubular.

25. The well as claimed in claim 24, wherein the apparatus for use in sensing temperature in a wellbore is provided entirely below the annular sealing device.

26. The well as claimed in claim 24, wherein the metallic tubing of the apparatus for use in sensing temperature in a wellbore does not extend across the annular sealing device.

27. The well as claimed in claim 17, wherein the well apparatus comprises a tubular element and wherein the metallic tubing of the apparatus for use in sensing temperature in a wellbore extends at least one of along and around the tubular element.

28. The well as claimed in claim 27, wherein the tubular element in the well is a drill string, and wherein the drill string comprises a drill bit.

29. The well as claimed in claim 27, wherein the metallic tubing is clamped to the tubular element in the well.

30. A well comprising:
a well apparatus having an apparatus for use in sensing temperature in a wellbore, the apparatus comprising:
a metallic tubing comprising at least 10 temperature sensor modules provided at locations along the inside of the metallic tubing, each temperature sensor module comprising a temperature sensor comprising a crystal oscillator having an electrical oscillation frequency that varies with temperature; the metallic tubing having an external diameter of less than 14 mm at the location of the at least 10 temperature sensor modules, wherein the metallic tubing is clamped to and extends across perforating guns.

31. The well as claimed in claim 30, wherein the apparatus is configured to monitor the firing of the perforating gun.

32. The well as claimed in claim 30, wherein the apparatus extends across multiple perforating guns, and the multiple perforating guns are independently activatable.

33. A method of operation of an apparatus to determine a thermal characteristic of a temperature sensor thereof, the apparatus comprising:
metallic tubing comprising at least 10 temperature sensor modules provided at locations along the inside of the metallic tubing, each temperature sensor module comprising a temperature sensor comprising a crystal oscillator having an electrical oscillation frequency that varies with temperature;
the metallic tubing having an external diameter of less than 14 mm at the location of the at least 10 temperature sensor modules,
the method comprising:
actively one of heating and cooling at least one of the temperature sensors in the metallic tubing; and
monitoring a change of temperature of the at least one of the temperature sensors during and/or after the one of heating and cooling.

34. The method as claimed in claim 33, further comprising, based on at least one of the change of temperature, a rate of change of temperature, and a power to create a change temperature of a sensor during and/or after the one of heating and cooling, inferring a fluid characteristic of the environment to which the metallic tubing is exposed at the location of the temperature sensors.

35. An apparatus for use in sensing temperature along a wellbore, comprising:
a metallic tubing comprising at least 10 temperature sensor modules provided at locations along the inside of the metallic tubing, each temperature sensor module comprising a temperature sensor, each temperature sensor comprising a crystal oscillator having an electrical oscillation frequency that varies with temperature;

the metallic tubing having an external diameter of less than 14 mm at the location of the at least 10 temperature sensor modules; and wherein the metallic tubing containing the temperature sensor modules is arranged as at least one of a ring and a helix to extend around a tubular element of a well apparatus.

* * * * *